United States Patent
Thinnes

(10) Patent No.: US 7,049,830 B1
(45) Date of Patent: May 23, 2006

(54) SENSOR DEVICE AND METHOD FOR INTERROGATING A SENSOR DEVICE

(75) Inventor: Martin Thinnes, Trierweiler (DE)

(73) Assignee: I.E.E. International Electronics & Engineering S.ar.l., Luxembourg (LU)

( * ) Notice: Subject to any disclaimer, the term of this patent is extended or adjusted under 35 U.S.C. 154(b) by 759 days.

(21) Appl. No.: 10/070,695

(22) PCT Filed: Sep. 7, 2000

(86) PCT No.: PCT/EP00/08756

§ 371 (c)(1),
(2), (4) Date: Mar. 5, 2002

(87) PCT Pub. No.: WO01/18515

PCT Pub. Date: Mar. 15, 2001

(30) Foreign Application Priority Data

Sep. 8, 1999 (LU) ........................................ 90437

(51) Int. Cl.
*G01R 27/08* (2006.01)
*G01R 19/00* (2006.01)

(52) U.S. Cl. ..................................... 324/691; 324/76.11

(58) Field of Classification Search ................ 324/691, 324/649, 600, 609, 76.11, 158.1; 340/870.38, 340/870.01, 870.02, 870.03, FOR. 279; 702/196, 702/190, 189, 127, 104
See application file for complete search history.

(56) References Cited

U.S. PATENT DOCUMENTS

| | | | | |
|---|---|---|---|---|
| 3,573,773 A | * | 4/1971 | O'Hanlon | 340/870.27 |
| 4,374,384 A | * | 2/1983 | Moates | 340/870.38 |
| 4,673,933 A | | 6/1987 | Bauer | |
| 4,709,228 A | * | 11/1987 | Hucking et al. | 341/25 |
| 4,725,816 A | * | 2/1988 | Petterson | 341/24 |
| 5,668,544 A | | 9/1997 | Chang et al. | |
| 6,392,636 B1 | * | 5/2002 | Ferrari et al. | 345/173 |
| 6,789,034 B1 | * | 9/2004 | Freed | 702/104 |
| 6,853,306 B1 | * | 2/2005 | Nitschke et al. | 340/667 |

* cited by examiner

*Primary Examiner*—Diane I. Lee
*Assistant Examiner*—Hoai-An D. Nguyen
(74) *Attorney, Agent, or Firm*—McCormick, Paulding & Huber LLP

(57) ABSTRACT

A sensor device includes i sensor elements of a first type and j additional sensor elements of a second type, the i sensor elements of the first type being connected in a circuitry (n×m) matrix array with n row conductors and m column conductors, where i, j, n and m are natural numbers other than zero and where $1 \leq i \leq n*m$. Each of the i sensor elements of the first type is connected between one of the n row conductors and one of the m column conductors and each of the j additional sensor elements of the second type is connected between two of the n row conductors.

15 Claims, 3 Drawing Sheets

SENSOR DEVICE AND METHOD FOR INTERROGATING A SENSOR DEVICE

FIELD OF THE INVENTION

The present invention relates to a sensor device comprising several variable-resistance sensors interconnected in a matrix array.

BACKGROUND OF THE INVENTION

In order to interrogate (i.e. read out) variable-resistance sensor elements, such as pressure-sensitive resistances or thermistors, an electrical test voltage is applied to the sensor element and the current resulting from the voltage applied is measured. This allows the instantaneous electrical resistance of the sensor element to be calculated, from which the variable to be measured (pressure, temperature etc.) can be determined.

A sensor device with pressure-sensitive sensors may, for example, be used in a seat occupancy detection function to control an active passenger restraint system in a vehicle. A sensor mat of this kind comprises several individual pressure-sensitive sensors integrated into the seat and distributed over the surface of the passenger seat. These sensors are connected to an analysing unit, which checks the triggered condition of the individual sensors. If the seat is occupied by a person, several of the sensors are triggered by the force exerted by the weight of a person on the seat, and this condition is recognised by the connected analysing circuit as indicating that the seat is occupied. This information is then passed on to the airbag control system.

In order to allow the sensors to be interrogated selectively, each of the sensors must in principle be connected to the analysing circuit. In order to reduce the number of connecting conductors, it is advisable to operate the individual sensors in a matrix array. This means that, for a quantity of n*m sensor elements, n row conductors and m column conductors are basically provided, each of the sensor elements being connected between one row conductor and one column conductor.

It should be noted that a matrix array of this kind constitutes a circuitry configuration. In other words, a matrix array in a real configuration does not require that the sensor elements be arranged in a regular grid layout, nor does it require that the individual connecting conductors run in straight lines parallel or perpendicular to one another.

The procedure for analysing a configuration in which sensors are interconnected in a matrix array is as follows. First the whole matrix array, with the exception of a first column conductor, is set to the same potential, e.g. to ground. A test voltage is then applied to the first column conductor, after which the current flowing through the individual row conductors is measured selectively. This allows resistance values to be determined selectively for those sensor elements which are connected between the first column conductor and the various row conductors. If this procedure is repeated for each of the column conductors, all the sensor elements can be measured selectively, one after the other. It should be noted here that, as an alternative means of interrogating the individual sensor elements, it is possible to apply the test voltage to each row conductor and measure the current passing through the sensor elements at the column conductor.

If the number of sensors in a sensor mat of this kind is to be increased, generally speaking the number of connecting conductors must also be increased. This means, for example, that if the (n×m) matrix is extended to an ((n+1)×m) matrix, another row conductor will have to be introduced to incorporate the additional sensors into the matrix array.

In practice, however, such an increase in the number of connecting conductors leads to several problems. For instance, having a large number of conductor paths leads to difficulties in designing the shape of the sensor mat. The individual sensors in a seat occupancy sensor, for example, are arranged in a sandwich structure consisting of two carrier films and a spacer which, on the one hand must form a coherent whole, but on the other hand must cover as small an area as possible if seat comfort is not to be impaired. The individual sensors are therefore connected to one another simply by narrow bridges in the sandwich structure through which the connecting conductors of the sensors must run. Increasing the number of required connecting conductors makes it more difficult to run the conductors through the narrow connecting bridges, or makes it necessary to widen the connecting bridges, which makes a sensor mat of this kind in a vehicle seat more noticeable.

On the other hand, the number of connecting conductors can only be increased if the analysis circuit has a corresponding number of inputs and outputs respectively. Indeed, each row conductor and column conductor must be connected to the analysis circuit so that either a test voltage can be applied to the conductor concerned or the current flowing through the conductor can be measured. Increasing the number of connecting conductors therefore results in a more complicated and hence more expensive analysis circuit.

SUMMARY OF THE INVENTION

The purpose of the present invention is therefore to propose a sensor device which has a higher number of sensors while the number of connecting conductors remains the same.

This purpose is achieved by means of a sensor device according to the present invention. Such a sensor device comprises i sensor elements of a first type which are interconnected in a circuitry (n×m) matrix array with n row conductors and m column conductors, where i, n and m are natural numbers other than zero, and where $1 \leq i \leq n*m$. It should be noted that a matrix array of this kind constitutes a circuitry arrangement. This means that a matrix array in a real arrangement does not require that the sensor elements be arranged in a regular grid layout, nor does it require that the individual connecting conductors run in straight lines parallel or perpendicular to one another. Each of the i sensor elements is connected between one row conductor and one column conductor.

According to the present invention, the sensor device has j additional sensor elements of a second type, where j is a natural number other than zero, each of the j additional sensor elements of the second type being connected between two row conductors. Alternatively, the sensor device may have k additional sensor elements of a second type, where k is a natural number other than zero, each of the k additional sensor elements of the second type being connected between two column conductors.

In addition to the standard, conventional matrix array of sensor elements, the device proposed in the present invention includes one or more additional sensors, each of which is connected between either two row conductors or two column conductors. In both cases it is possible to interrogate the additional sensor elements individually without the need to incorporate additional connecting conductors into the sensor device for this purpose. In this case the term "connecting conductors" simply refers to row or column conductors which must be led out of the sensor device and connected directly to the analysis circuit. It follows that this term should not be applied to the conductor paths by which the additional sensor elements are connected to the respective row or column conductors.

In order to individually analyse the sensor elements in the traditional matrix array, the same procedure is used as for a conventional matrix array. To this end the whole matrix array with the exception of a first column conductor is first set to the same potential, e.g. to ground. A test voltage is then applied to the first column conductor, after which the current flowing through the individual row conductors is selectively measured. This allows the resistance values of the sensor elements connected between the first column conductor and the various row conductors to be determined selectively. By repeating this procedure for each of the column conductors it is possible to measure all of the sensor elements selectively, one after the other. It should be noted here that, as an alternative, the test voltage can be applied to the individual row conductors, and the individual sensor elements can then be interrogated by measuring the current flowing through them at the column conductors. In this procedure the additional sensor elements do not interfere with the interrogation of the conventional sensor elements because, as a consequence of the measurement method, they are at the same voltage at both contact points, and are therefore not included in the measurement result.

A similar method is used in order to read out each of the additional sensor elements which have been connected between two column conductors. First the whole matrix array, with the exception of a first column conductor, is set to the same potential, e.g. to ground. A test voltage is then applied to the first column conductor, after which the current flowing through the other column conductors is measured selectively. This allows resistance values to be determined selectively for those sensor elements which are connected between the first column conductor and one of the other column conductors. If this procedure is repeated for each of the column conductors, all the sensor elements connected in this way can be measured selectively, one after the other. A similar method is used to read out each of the sensor elements which have been connected between two row conductors. Once again it should be noted that the sensor elements arranged in the conventional matrix array do not affect the results of measurements on the additional sensor elements, because as a consequence of the measurement procedure used they are at the same voltage at both contact points, and are therefore not included in the measurement result.

The advantage of the configuration proposed in the present invention is therefore that it allows additional sensor elements to be measured without the need for additional wiring, and without interfering with the conventional method of measuring matrix components at the points of intersection between row and column conductors. Existing analysis circuits can therefore be used without modification with this extended sensor configuration, in which case the extension is not used, but does not interfere with normal operation.

In all of the above measurement steps the columns and rows are selected either directly using drivers and amplifier circuits on each row and column or by using individual drivers and measurement amplifiers connected via a multiplexer to the rows or columns which are to be measured or selected. In a particular advantageous embodiment, a device to interrogate the sensor elements comprises n+m control devices, which can be connected to the n row conductors and the m column conductors, each control device being designed to be individually switchable in such a way that in a first mode it can operate as a driver cell to apply a test voltage to the row or column conductor to be connected, and in a second mode it can operate as a measuring transformer to process the signal at the column or row conductor which is to be connected. An analysis circuit of this kind allows the individual rows or column conductors to be selected in a particularly flexible manner, which in turn allows measurements to be made between both a single row conductor and a single column conductor, and also between two row conductors or two column conductors.

In a particular advantageous embodiment of the sensor device, the device comprises j+k additional sensor elements of a second type, where j and k are both natural numbers other than zero, with each of the additional sensor elements of the second type connected between two column conductors or two row conductors. By extending the conventional sensor matrix in both dimensions, i.e. as well between row conductors as between column conductors, it is possible to optimise the number of sensor elements which can be interrogated using the same number of connecting conductors. This approach allows a maximum of $$\frac{n*(n-1)}{2}$$

additional sensor elements to be connected between the n row conductors and $$\frac{m*(m-1)}{2}$$

additional sensor elements to be connected between the m column conductors. It will be clear to the skilled person that, depending on the application and the requirements, it is also possible to incorporate fewer additional sensor elements into the conventional matrix array. It should be noted that the sensor elements of both the first and second types can be designed in such a way that they perform an identical function in the sensor device. To this end the different types of sensor element may, for example, be configured identically. Alternatively, the same function, such as pressure measurement, of the two types of sensor element can also be performed with a different structural form. In the case of a sensor mat using so-called film pressure sensors, the sensor elements of the first type may, for example, be designed in such a way that they operate in through mode, while the sensor elements of the second type may operate in shunt mode.

In the case of film pressure sensors which operate in trough mode, a first contact is arranged on a first carrier film and a second contact is arranged on a second carrier film, both carrier films being positioned a certain distance apart in such a way that the two contacts are facing one another. A layer made of a semiconducting material is arranged between the two contacts, which is pressed against the two contacts when the sensor is triggered. The resistance between the two contacts varies according to the pressure applied. This type of sensor is particularly suitable for producing sensor mats because in this design the row conductors are printed onto one carrier film while the column conductors can be arranged on the other carrier film. This arrangement of the various connection paths on different carrier films does not cause any problems at the points of intersection between the various connecting conductors because the latter run at different levels.

Film pressure sensors operating in shunt mode have two contacts arranged on a first carrier film at a certain distance from another. On a second carrier film spaced from the first a semiconducting layer is mounted in such a way that it covers the area between the two contacts, bringing the two contacts into contact when the carrier films are pressed together. This type of sensor is therefore particularly suitable as a design for the additional sensor elements, because both contacts are deposited on a single carrier film, and are therefore easy to contact with the row or column conductors on this carrier film.

In an advantageous embodiment of the sensor device, at least one of the sensor elements of the second type is designed in such a way that the at least one sensor element of the second type performs a function in the sensor device, which is different from the function performed by the sensor elements of the first type. Such a sensor element with a different function might, for example, allow environmental influences to be monitored and/or compensated for. In this way several compensation elements can be introduced into a conventional sensor device in a matrix array which will, for example, allow temperature influences to be compensated for without degrading the resolution of the original sensor matrix.

It should be noted that a few of the additional sensor elements may perform the same function as the i normal sensor elements, while other additional sensor elements may perform a different function in the sensor device.

BRIEF DESCRIPTION OF THE DRAWINGS

The text which follows describes various embodiments of the invention with reference to the attached illustrations. These show.

DETAILED DESCRIPTION OF THE PREFERRED EMBODIMENT

Figure 1:
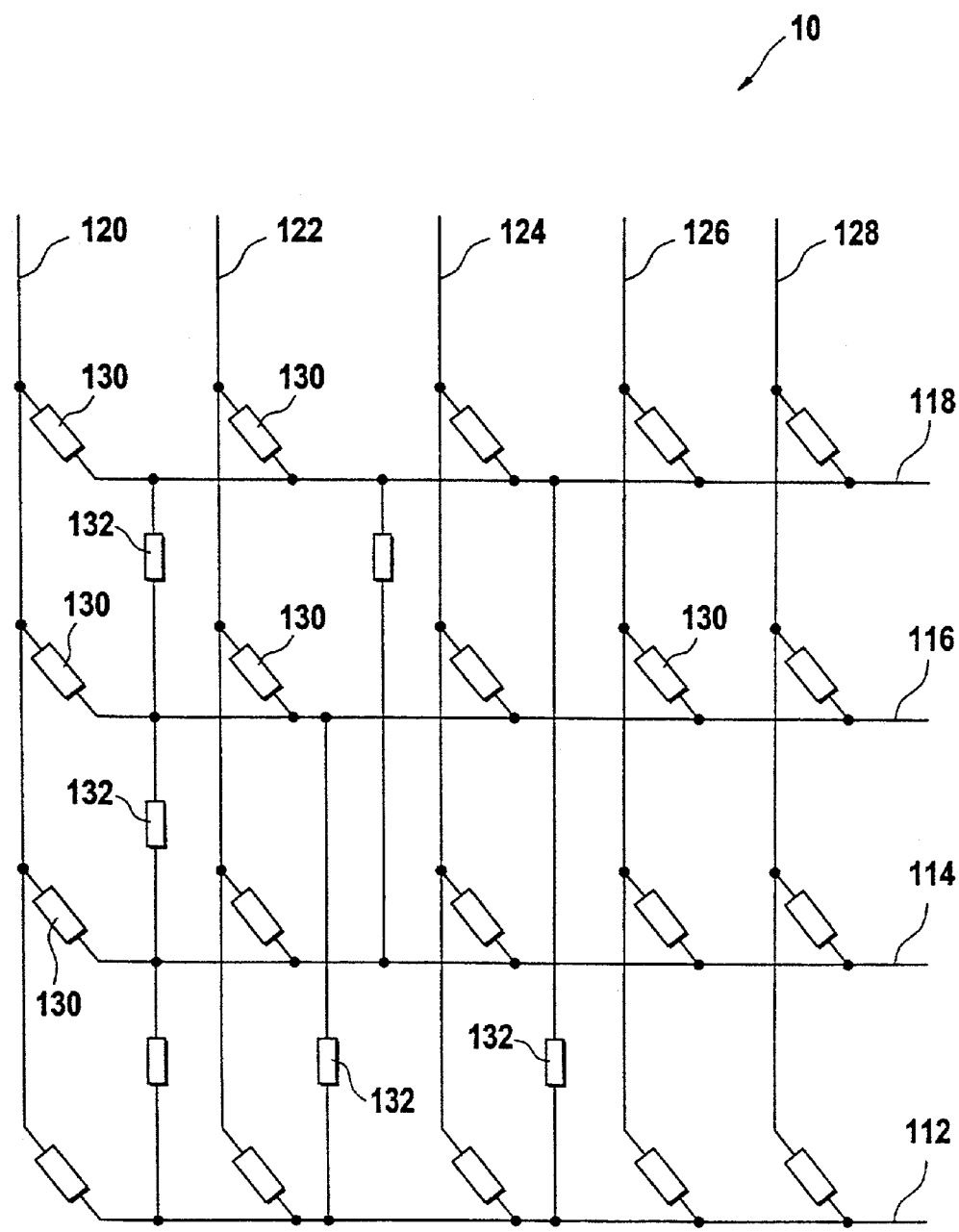
FIG. 1: a sensor device in a matrix array with additional sensor elements which are connected between the row conductors.

FIG. 1 shows an first embodiment of an improved sensor arrangement. Sensor arrangement 10 comprises several row conductors 112, 114, 116 and 118 as well as several column conductors 120, 122, 124, 126 and 128. The design shown is therefore a (4×5) matrix array. At each intersection point between one of row conductors 112, 114, 116 and 118 and one of column conductors 120, 122, 124, 126 and 128 a sensor element 130 (depicted as a resistance) is connected in a conventional manner between the respective row and column conductor. In the (4×5) matrix array shown, 4*5=20 sensor elements 130 can be connected in this way. These sensor elements 130 might, for example, include pressure-sensitive resistances or thermistors.

In addition to the sensor elements 130, other sensor elements 132 are present in the present sensor arrangement 10, each of which is connected between two of row conductors 112, 114, 116 and 118. Between each pair of rows 112–114, 112–116, 112–118, 114–116, 114–118 and 116–118 an additional, individually interrogateable sensor element 132 can be connected. In the configuration shown with four row conductors it is therefore possible to incorporate a maximum of six additional, individually interrogateable sensor elements 132. It will be easy for the skilled person to verify that the maximum number ($j_{max}$) of additional sensor elements 132 obeys the formula $$j_{max} = \frac{n*(n-1)}{2},$$

where n represents the number of row conductors available.

Figure 2:
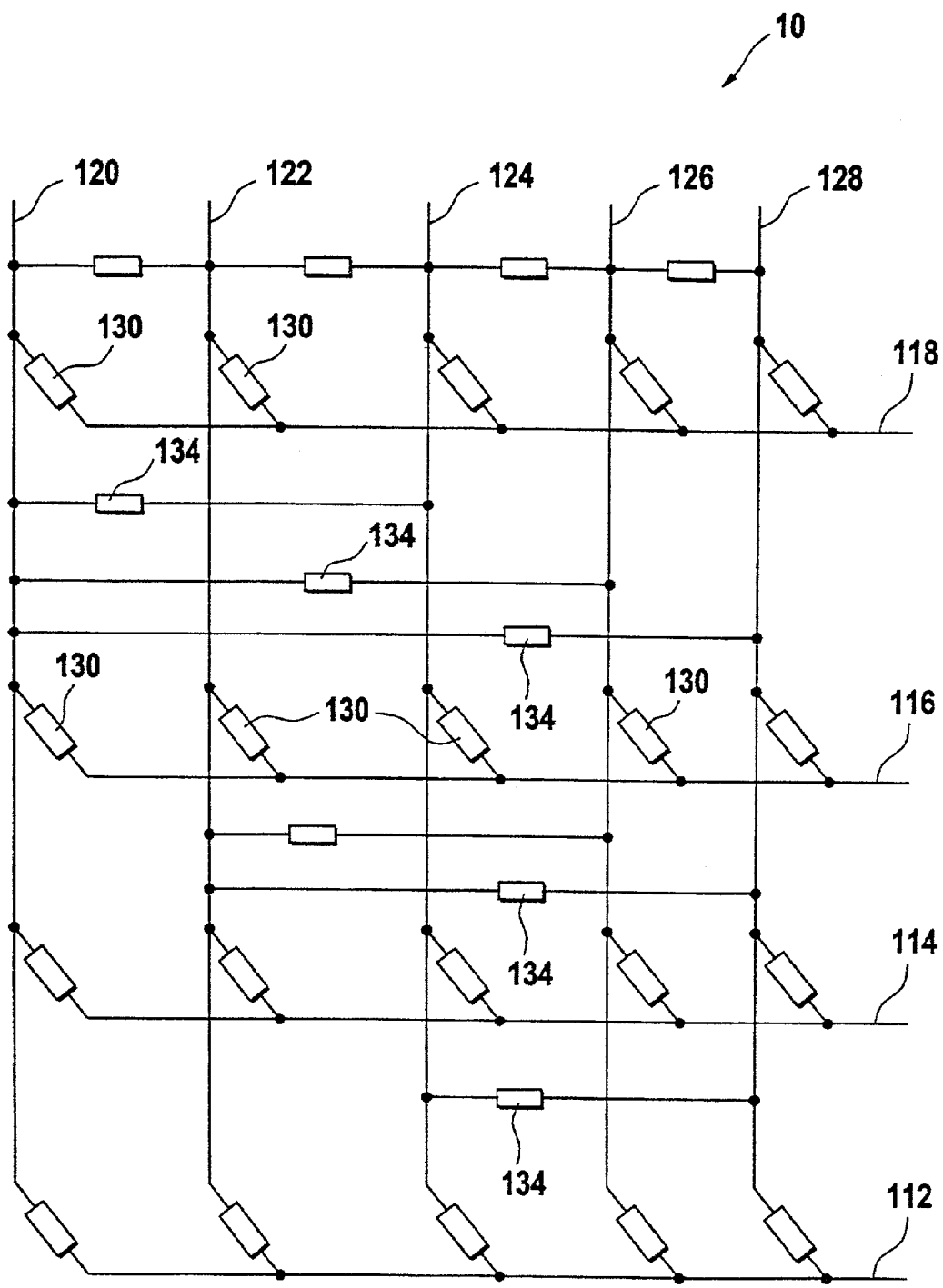
FIG. 2: a sensor device in a matrix array with additional sensor elements which are connected between the column conductors.

The sensor arrangement shown in FIG. 2 should be regarded as essentially similar to that shown in FIG. 1. Unlike the embodiment described above, in this embodiment additional sensor elements 134 are connected between column conductors 120, 122, 124, 126 and 128. Between each pair of columns 120–122, 120–124, 120–126, 120–128, 122–124, 122–126, 122–128, 124–126, 124–128 and 126–128 an additional, individually interrogateable sensor element 134 can be connected. In the configuration shown with five column conductors it is therefore possible to incorporate a maximum of ten additional, individually interrogateable sensor elements 134. It will be easy for the skilled person to verify that the maximum number ($k_{max}$) of additional sensor elements (134) obeys the formula $$k_{max} = \frac{m*(m-1)}{2},$$

where n represents the number of column conductors available.

It should be noted that in order to make full use of the interconnection possibilities offered by the available row and column conductors, additional sensor elements can be incorporated into the matrix array in both dimensions. A design of this kind is essentially a combination of the two designs in FIG. 1 and FIG. 2. The maximum number of individually interrogateable sensor elements 132 and 134 that can be incorporated into the conventional matrix array in this way is therefore $$j_{max} + k_{max} = \frac{n*(n-1)}{2} + \frac{m*(m-1)}{2}.$$

Figure 3:
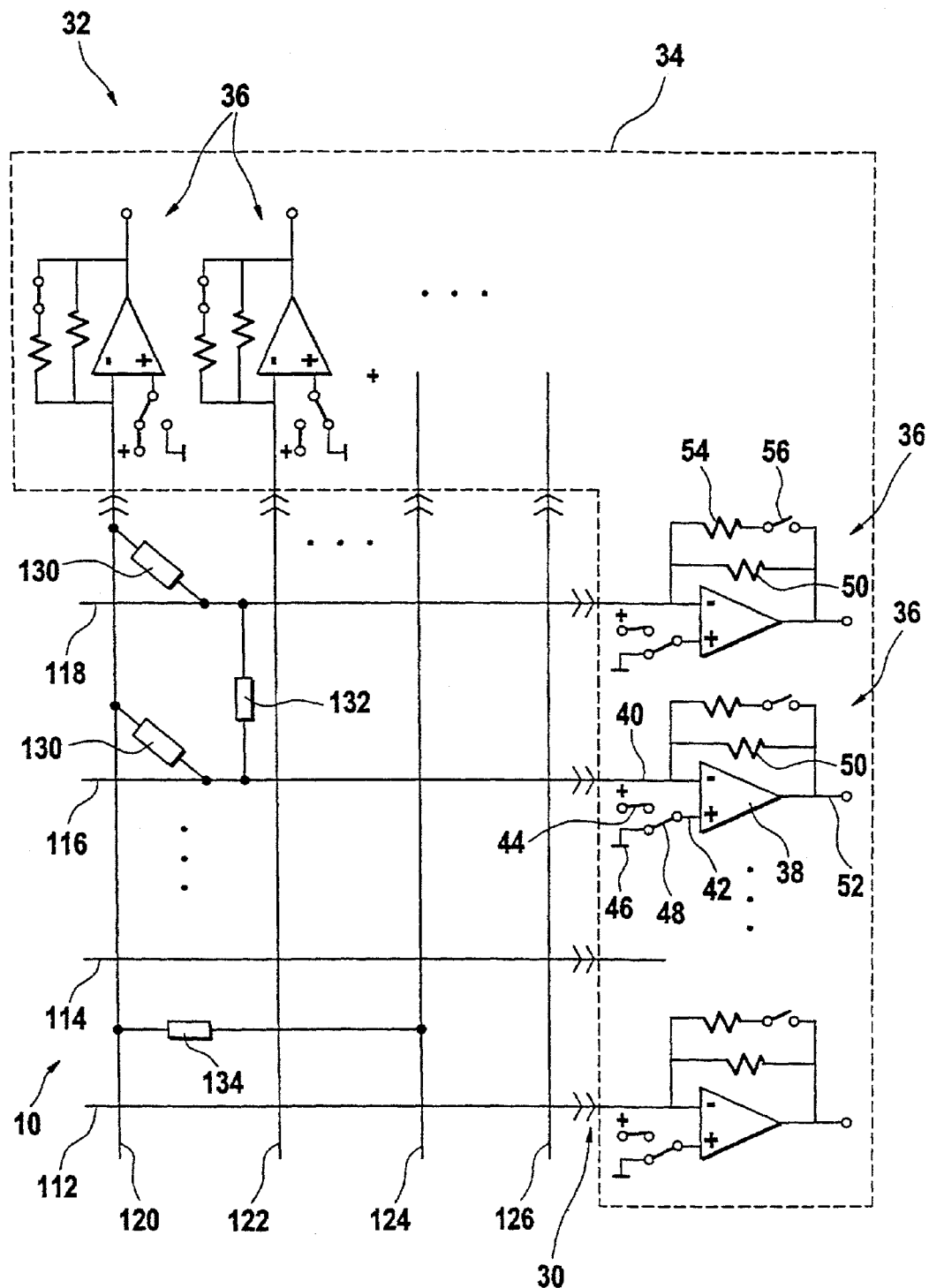
FIG. 3: a useful circuit for interrogating a sensor device with additional sensor elements.

FIG. 3 shows an advantageous arrangement for interrogating the sensor devices described above. The actual sensor arrangement 10 (in this case a (4×4) matrix) is not shown in full here. In the interests of clarity, the illustration shows only two of the sensor elements 130 and one each of the additional sensor elements 132 and 134, but it will be clear to the skilled person that corresponding sensor elements 130, 132 and 134 could also be connected between the other column and row conductors or between the respective row conductors and/or between the respective column conductors.

Sensor arrangement 10 is connected via a plug or clamp connector 30 to the device 32 for interrogating the sensor elements. This device includes several control devices 36, preferably arranged in a common housing 34, each of which can be connected to one of row or column conductors 12–18 and 20–26 via the plug or clamp connector. Once again, in the interests of clarity the illustration shows only a few of the control devices 36.

Each control device 36 comprises a negative feedback operational amplifier 38 whose negated input 40 can be connected to the respective row or column conductors 12–18 and 20–26, and whose non-negated input 42 can be switched between a connection 44 to a drive voltage and a connection 46 to a reference potential. This switching should preferably take place via an electronically controlled switch 48. The reference potential is represented by a virtual ground whose potential lies between the actual ground and the circuit's supply voltage, e.g. at half the supply voltage.

This embodiment makes use of the principle that a negative feedback operational amplifier 38 of this kind attempts to reduce the difference in voltage between the negated and non-negated inputs to zero. Thus if a specific control device 36 is to work as the driver cell, e.g. the control device connected to column conductor 20, the non-negated input 40 of the operational amplifier 38 is connected to connection 44 of the driver voltage. The operational amplifier 38 then drives column 20, which is connected to the negated input (40), via the negative feedback resistance 50.

In order to interrogate the sensor elements 130 connected between column conductor 120 and the various row conductors 112–118, the remaining column conductors 122–126 and row conductors 112–118 must be set to the reference potential. To this end the non-negated inputs 42 of the corresponding operational amplifiers 38 are connected to connection 46 for the reference voltage. These operational amplifiers 38 then act as current-voltage transformers which transform the current flowing through whichever row or column is connected, i.e. the current flowing via the sensor element 130 which is to be measured, into an output voltage at the output 52 of the operational amplifier which is proportional to the resistance of the sensor element.

The resistance value of the negative feedback of the individual operational amplifiers 38 should preferably be adjustable. In the embodiment shown, this is achieved by using a second negative feedback resistance 54 which can be connected in parallel to the first negative feedback resistance 50 by means of an electronically controlled switch 56. This has the advantage of making it possible to adjust the measuring sensitivity of the control devices 36 which have been connected as measuring transformers, thus allowing a high level of accuracy to be achieved in measurements. Furthermore, using the variable negative feedback resistances on the control devices which have been connected as driver cells allows the current flowing into the sensor arrangement 10 to be adjusted.

One possible measurement sequence using the device presented to interrogate several sensor elements is as follows:

All the row and column conductors are first set to the reference potential (i.e. the virtual ground) by connecting the non-negated inputs 42 of the operational amplifiers 38 to the appropriate connection 46. Sensor configuration 10 is now unpowered and in idle state.

At the start of the measurement cycle, the non-negated input 42 of the operational amplifier 38 of one column 120 is connected to the connection 44 of the driver voltage. All the resistance values of the sensor elements 130 connected between the column conductor 120 and the various row conductors 112–118 can now be measured one after the other.

The non-negated input 42 of the operational amplifier 38 connected to the column conductor 120 is then switched to the reference potential again and the next column, 122, is selected. In this way it is possible to work through each of the columns in turn, after which the sensor elements 132 connected between the row conductors and the sensor elements 134 connected between the column conductors can be read out in the same way. At the end of such a measurement cycle the resistance values of all the sensor elements 130, 132 and 134 will then have been determined. In a second measurement cycle it is then possible, once the negative feedback resistances on the operational amplifiers 38 have been changed, to interrogate all the sensor elements in another measuring range, for example. Comparing the two resistance values obtained allows conclusions to be drawn about any defects in the matrix.

The invention claimed is:

1. A sensor device comprising i sensor elements of a first type and j additional sensor elements of a second type, the i sensor elements of the first type being connected in a circuitry (n×m) matrix array with n row conductors and m column conductors, where i, j, n and m are natural numbers other than zero and where $1 \leq i \leq n*m$, wherein each of the i sensor elements of the first type is connected between one of said n row conductors and one of said m column conductors and wherein each of the j additional sensor elements of the second type is connected between two of the n row conductors.

2. The sensor device according to claim 1, comprising k additional sensor elements of a second type, where k is a natural number other than zero, wherein each of the k additional sensor elements of the second type is connected between two of the in column conductors.

3. The sensor device according to claim 1, wherein $$1 \leq j \leq \frac{n*(n-1)}{2}.$$

4. The sensor device according claim 1, wherein the sensor elements of the first type and the sensor elements of the second type are designed in such a way that they perform an identical function in the sensor device.

5. The sensor device according to claim 1, wherein at least one of the sensor elements of the second type is designed in such a way that the at least one sensor element of the second type performs a function in the sensor device which differs from the function performed by the sensor elements of the first type.

6. The sensor device according to claim 1, further comprising a device for interrogating a sensor device including n+m control devices which are connectable to the n row conductors and the m column conductors, each control device being individually switchable in such a way that in a first mode the control device operates as a driver cell for applying an electrical test voltage to the row or column conductor to be connected, and in a second mode the control device operates as a measuring transformer for processing the signal at the column or row conductor which is to be connected.

7. The sensor device according to claim 2, wherein $$1 \leq j \leq \frac{n*(n-1)}{2}.$$

8. The sensor device according to claim 2, wherein $$1 \leq k \leq \frac{m*(m-1)}{2}.$$

9. The sensor device according claim 2, wherein the sensor elements of the first type and the sensor elements of the second type are designed in such a way that they perform an identical function in the sensor device.

10. The sensor device according to claim 2, wherein at least one of the sensor elements of the second type is designed in such a way that the at least one sensor element of the second type performs a function in the sensor device which differs from the function performed by the sensor elements of the first type.

11. A sensor device comprising i sensor elements of a first type and k additional sensor elements of a second type, the i sensor elements of the first type being connected in a circuitry (n×m) matrix array with n row conductors and m column conductors, where i, k, n and m are natural numbers other than zero and where $1 \leq i \leq n*m$, wherein each of the i sensor elements of the first type is connected between one of said n row conductors and one of said m column conductors and wherein each of the k additional sensor elements of the second type is connected between two of the in column conductors.

12. The sensor device according to claim 11, further comprising a device for interrogating a sensor device including n+m control devices which are connectable to the n row conductors and the m column conductors, each control device being individually switchable in such a way that in a first mode the control device operates as a driver cell for applying an electrical test voltage to the row or column conductor to be connected, and in a second mode the control device operates as a measuring transformer for processing the signal at the column or row conductor which is to be connected.

13. The sensor device according to claim 11, wherein $$1 \leq [[j]]\underline{k} \leq \frac{m*(m-1)}{2}.$$

14. The sensor device according claim 11, wherein the sensor elements of the first type and the sensor elements of the second type are designed in such a way that they perform an identical function in the sensor device.

15. The sensor device according to claim 11, wherein at least one of the sensor elements of the second type is designed in such a way that the at least one sensor element of the second type performs a function in the sensor device which differs from the function performed by the sensor elements of the first type.

* * * * *

UNITED STATES PATENT AND TRADEMARK OFFICE
CERTIFICATE OF CORRECTION

PATENT NO. : 7,049,830 B1 Page 1 of 1
APPLICATION NO. : 10/070695
DATED : May 23, 2006
INVENTOR(S) : Martin Thinnes It is certified that error appears in the above-identified patent and that said Letters Patent is hereby corrected as shown below:

Claim 2:
  Column 8, line 28, after "the", please delete "in" insert -- m --.

Claim 11:
  Column 9, line 21, after "the", please delete "in" insert -- m --.

Claim 13:
  Column 10, line 12, after "<", please delete "[[j]]k" insert -- k --.

Signed and Sealed this

Fifteenth Day of August, 2006

JON W. DUDAS
*Director of the United States Patent and Trademark Office*